United States Patent
Cariccia et al.

(10) Patent No.: US 9,850,997 B2
(45) Date of Patent: Dec. 26, 2017

(54) FILTERING PULLEY FOR A BELT DRIVE

(71) Applicant: DAYCO EUROPE S.R.L., Chieti (IT)

(72) Inventors: Gianluca Cariccia, Oristano (IT); Federico Domenico Licata, Turin (IT)

(73) Assignee: Dayco Europe S.R.L, Chieti (IT)

( * ) Notice: Subject to any disclaimer, the term of this patent is extended or adjusted under 35 U.S.C. 154(b) by 0 days.

(21) Appl. No.: 14/910,403

(22) PCT Filed: Aug. 6, 2014

(86) PCT No.: PCT/IB2014/063737
§ 371 (c)(1),
(2) Date: Feb. 5, 2016

(87) PCT Pub. No.: WO2015/019301
PCT Pub. Date: Feb. 15, 2015

(65) Prior Publication Data
US 2016/0195182 A1    Jul. 7, 2016

(30) Foreign Application Priority Data
Aug. 6, 2013 (IT) .............................. TO2013A0677

(51) Int. Cl.
*F16H 55/36* (2006.01)
*F16F 15/121* (2006.01)

(52) U.S. Cl.
CPC ......... *F16H 55/36* (2013.01); *F16F 15/1216* (2013.01); *F16H 2055/366* (2013.01)

(58) Field of Classification Search
CPC .............................. F16H 55/36; F16F 15/1216
(Continued)

(56) References Cited

U.S. PATENT DOCUMENTS 2,866,349 A    12/1958 Heckethorn
2,885,042 A    5/1959 Frechette
(Continued)

FOREIGN PATENT DOCUMENTS

DE    10 2009 038221 A1    2/2011
EP    0803030    12/2000
(Continued)

OTHER PUBLICATIONS

PCT, International Search Report and Written Opinion, Application No. PCT/US2012/069386 (dated Feb. 26, 2013).
(Continued)

*Primary Examiner* — William E Dondero
*Assistant Examiner* — Mark K Buse
(74) *Attorney, Agent, or Firm* — FisherBroyles, LLP; Susan M. Oiler (57) ABSTRACT

A filtering pulley for an accessory drive of an internal combustion engine, having a hub suitable for connection to an engine accessory, an annular crown provided with a profile configured to cooperate with a drive belt, a coil spring able to transmit torque between the crown and the hub, a first carrier constrained to a first end of the spring and a second carrier constrained to a second end of the spring. The annular crown is externally coaxial to the hub and supported in a rotationally free manner on the hub, and each of the carriers is rotationally coupled to both the hub and the crown with a limited possibility of relative rotation with respect to each of them.

14 Claims, 6 Drawing Sheets

(58) Field of Classification Search
USPC .......................................................... 474/94
See application file for complete search history.

(56) References Cited

U.S. PATENT DOCUMENTS

| | | | |
|---|---|---|---|
| 3,129,797 A | 4/1964 | Orcutt et al. | |
| 3,436,977 A | 4/1969 | Gredell | |
| 3,618,730 A | 11/1971 | Mould, III | |
| 4,550,817 A | 11/1985 | Euler | |
| 4,725,260 A | 2/1988 | Komorowski et al. | |
| 4,826,471 A | 5/1989 | Ushio | |
| 5,012,905 A | 5/1991 | Tanaka | |
| 5,139,463 A | 8/1992 | Bytzek et al. | |
| 5,156,573 A | 10/1992 | Bytzek et al. | |
| 5,435,201 A | 7/1995 | Preston et al. | |
| 5,469,948 A | 11/1995 | Organek et al. | |
| 5,485,904 A | 1/1996 | Organek et al. | |
| 5,637,041 A | 6/1997 | Hamaekers et al. | |
| 5,680,921 A | 10/1997 | Vierk et al. | |
| 5,810,141 A | 9/1998 | Organek et al. | |
| 5,928,083 A | 7/1999 | Monahan et al. | |
| 6,083,130 A | 7/2000 | Mevissen et al. | |
| 6,394,248 B1 | 5/2002 | Monahan et al. | |
| 6,464,057 B2 | 10/2002 | Ouchi | |
| 6,488,135 B1 | 12/2002 | Kinoshita | |
| 6,494,799 B1 | 12/2002 | Ochiai | |
| 6,561,332 B2 | 5/2003 | Organek et al. | |
| 6,637,569 B1 | 10/2003 | Organek et al. | |
| 6,666,315 B2 | 12/2003 | Organek et al. | |
| 6,691,851 B2 | 2/2004 | Liu et al. | |
| 6,702,681 B1 | 3/2004 | Ochs | |
| 6,964,326 B2 | 11/2005 | Kamping | |
| 7,052,420 B2 | 5/2006 | King et al. | |
| 7,153,227 B2 | 12/2006 | Dell et al. | |
| 7,503,443 B1 | 3/2009 | Dobras | |
| 7,591,357 B2 | 9/2009 | Antchak et al. | |
| 7,618,337 B2 | 11/2009 | Jansen et al. | |
| 7,712,592 B2 | 5/2010 | Jansen et al. | |
| 7,766,774 B2 | 8/2010 | Antchak et al. | |
| 7,770,706 B2 | 8/2010 | Cali et al. | |
| 7,891,475 B2 | 2/2011 | Zhu et al. | |
| 7,931,552 B2 | 4/2011 | Pendergrass et al. | |
| 7,975,821 B2 | 7/2011 | Antchak et al. | |
| 7,998,008 B2 | 8/2011 | Kamdem et al. | |
| 8,006,819 B2 | 8/2011 | Dell et al. | |
| 8,021,253 B2 | 9/2011 | Dell et al. | |
| 8,038,555 B2 | 10/2011 | Pendergrass et al. | |
| 8,047,920 B2 | 11/2011 | Jansen et al. | |
| 8,132,657 B2 | 3/2012 | Antchak et al. | |
| 8,192,312 B2* | 6/2012 | Ali | F16F 15/121 474/94 |
| 8,813,932 B2 | 8/2014 | Ward et al. | |
| 8,820,503 B2 | 9/2014 | Schneider et al. | |
| 8,888,622 B2 | 11/2014 | Chen et al. | |
| 8,944,947 B2 | 2/2015 | Yamatani et al. | |
| 2002/0183147 A1 | 12/2002 | Fujiwara | |
| 2004/0014540 A1 | 1/2004 | Dell et al. | |
| 2005/0056100 A1 | 3/2005 | Yuan et al. | |
| 2005/0288136 A1 | 12/2005 | Lorenz | |
| 2006/0068954 A1 | 3/2006 | Kaga et al. | |
| 2006/0122014 A1 | 6/2006 | Kamdem | |
| 2007/0066426 A1 | 3/2007 | Kamdem et al. | |
| 2007/0131509 A1 | 6/2007 | Kimes | |
| 2008/0011572 A1 | 1/2008 | Yamane et al. | |
| 2008/0041687 A1 | 2/2008 | Cali et al. | |
| 2008/0207364 A1* | 8/2008 | Schebitz | F16F 15/1213 474/94 |
| 2009/0176608 A1 | 7/2009 | Jansen et al. | |
| 2009/0272618 A1 | 11/2009 | Pendergrass et al. | |
| 2010/0101909 A1 | 4/2010 | Dell et al. | |
| 2010/0113201 A1 | 5/2010 | Lannutti | |
| 2010/0116617 A1 | 5/2010 | Serkh et al. | |
| 2010/0140044 A1 | 6/2010 | Antchak et al. | |
| 2010/0147646 A1 | 6/2010 | Lannutti et al. | |
| 2010/0275711 A1 | 11/2010 | Shige et al. | |
| 2011/0015018 A1 | 1/2011 | Yamatani et al. | |
| 2011/0198185 A1 | 8/2011 | Lannutti et al. | |
| 2012/0000446 A1 | 1/2012 | Venton-Walters et al. | |
| 2012/0058847 A1 | 3/2012 | Ferguson et al. | |
| 2012/0298474 A1* | 11/2012 | Ward | F16D 7/022 192/41 S |
| 2012/0322592 A1 | 12/2012 | Mortari | |
| 2013/0049187 A1 | 2/2013 | Minamio et al. | |
| 2013/0161150 A1 | 6/2013 | McCrary | |
| 2013/0233670 A1 | 9/2013 | Ward et al. | |
| 2013/0237351 A1 | 9/2013 | Marion | |
| 2013/0267361 A1 | 10/2013 | Cali et al. | |
| 2013/0324335 A1 | 12/2013 | Chen et al. | |

FOREIGN PATENT DOCUMENTS

| | | |
|---|---|---|
| EP | 0980479 | 8/2003 |
| EP | 1764524 | 3/2007 |
| EP | 1772644 | 4/2007 |
| EP | 1590575 | 4/2010 |
| EP | 1692409 | 7/2010 |
| EP | 2258968 | 12/2010 |
| EP | 1844245 | 4/2013 |
| JP | 2005-163932 | 6/2005 |
| JP | 2006-329407 | 12/2006 |
| JP | 2010-127369 | 6/2010 |
| JP | 2010-127370 | 6/2010 |
| JP | 2011-169397 | 9/2011 |
| WO | 2007/121582 A1 | 11/2007 |
| WO | 2010/050408 | 5/2010 |
| WO | 2010/061805 | 6/2010 |
| WO | 2012/061930 A1 | 5/2012 |
| WO | 2012/061936 | 5/2012 |

OTHER PUBLICATIONS

"Learn About Torsion Springs" by Lee Spring Company (2011).
PCT, International Search Report and Written Opinion, Application No. PCT/US2013/046791 (dated Nov. 29, 2013).
Abstract, Ultimate Strength of Mechanical Diode Type One-Way Clutches, SAE International, Technical Papers (at least as early as Dec. 8, 2011).
One Way Clutch / Mechanical Diode™, Means Industries, Inc. (at least as early as Dec. 8, 2011).
Technology Introduction, Epilogics, The Mechanical Diode® Company, http://www.epilogics.com/md/tekintro.htm (at least as early as Dec. 8, 2011).
U.S., Non-Final Office Action, U.S. Appl. No. 13/713,247 (dated Dec. 23, 2014).
U.S., Final Office Action, U.S. Appl. No. 13/713,247 (dated Jul. 16, 2015).
PCT, International Search Report and Written Opinion, International Application No. PCT/IB2014/063737, dated Dec. 8, 2014.

* cited by examiner

FILTERING PULLEY FOR A BELT DRIVE

CROSS-REFERENCE TO RELATED APPLICATIONS

This application is a National Stage filing of International Application No. PCT/IB2014/063737, filed Aug. 6, 2014, which claims priority of Italian Application No. TO2013A000677, filed Aug. 6, 2013, which are incorporated herein by reference in their entireties.

TECHNICAL FIELD

The present invention relates to a filtering pulley, in particular for a belt drive of an internal combustion engine for a motor vehicle.

The present invention finds preferred, although not exclusive, application in the operation of an alternator or a reversible electric machine having the functions of alternator and starter motor in a start-stop system of an internal combustion engine.

BACKGROUND ART

In motor vehicles, the use of a filtering pulley for driving the alternator via the accessory drive belt is known.

This pulley comprises a hub suitable for being connected to the rotor of the alternator, an annular crown provided with a profile suitable for cooperating with the belt and a filtering unit interposed between the hub and the crown of the pulley to avoid subjecting the belt to dynamic overloads in the presence of torsional vibrations of the driveshaft or rapid variations in engine speed.

The filtering unit generally comprises a spring, for example a coil spring (helical or spiral), or a plurality of springs or other elastic elements arranged circumferentially between the hub and the crown.

In addition, since the alternator has relatively high inertia and tends to drive the pulley during instantaneous drops in driveshaft speed, it is known to incorporate a freewheel in the filtering unit that is able to transmit motion unidirectionally from the crown to the hub (normal operating condition) and disengage the hub from the crown in the event of torque reversal. The freewheel can be implemented, for example, by means of a band spring carried by either the hub or crown and able to expand or contract according to the torque direction to cooperate with, or disengage from, a corresponding annular friction surface integral with the other of the hub and crown.

The introduction of start-stop systems in which the alternator is replaced by a reversible electric machine having the function of starter motor or alternator according to the operating conditions makes it impossible to use a filtering pulley with a freewheel, because this would disengage the electric machine from the belt drive when the machine provides power.

DISCLOSURE OF INVENTION

The object of the present invention is a filtering pulley that can be used in a start-stop system and which enables relative rotation between hub and crown in two directions so as to substantially reduce dynamic overloads on the belt.

Another object of the present invention is to provide a filtering pulley with the aforesaid functionality that is compact and inexpensive to manufacture.

The aforesaid objects are achieved by a pulley according to claim 1.

BRIEF DESCRIPTION OF THE DRAWINGS

For a better understanding of the present invention, a preferred embodiment will now be described, purely by way of non-limitative example and with reference to the accompanying drawings, in which.

BEST MODE FOR CARRYING OUT THE INVENTION

Figure 1:
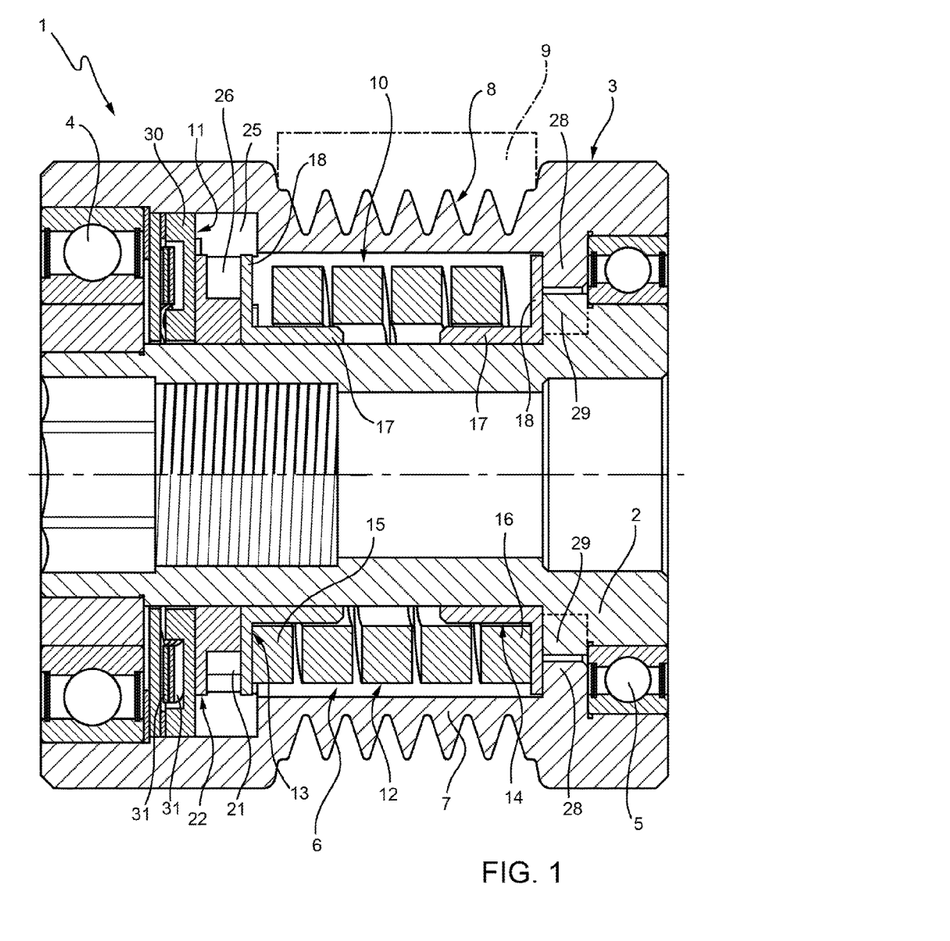
FIG. 1 is an axial cross-section of a filtering pulley according to the present invention.
Figures 2, 3:
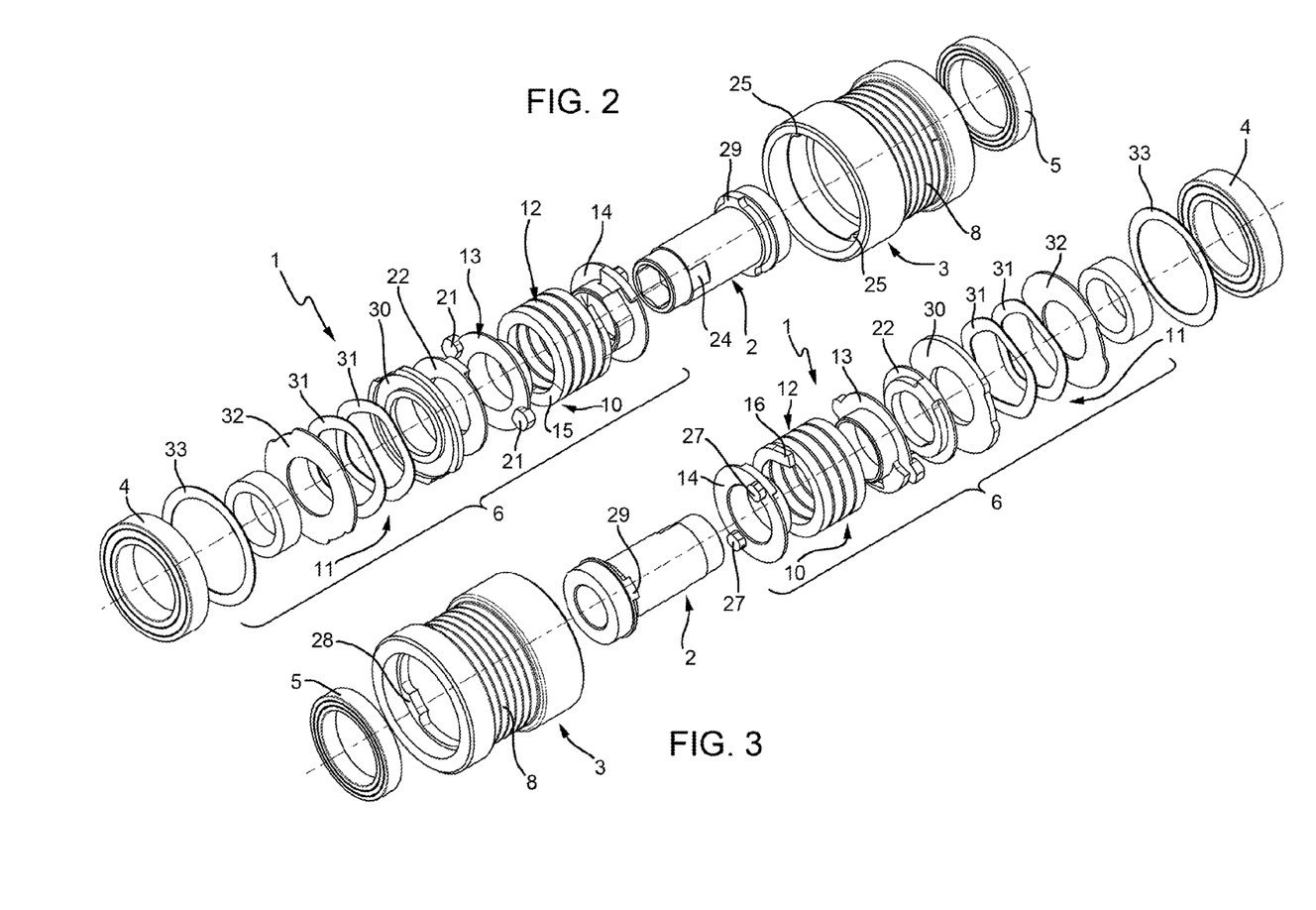
FIGS. 2 and 3 are exploded perspective views of the pulley in FIG. 1, from opposite viewpoints.

With reference to FIGS. 1, 2 and 3, reference numeral 1 indicates, as a whole, a filtering pulley according to the present invention.

The pulley 1 basically comprises a tubular hub 2, a tubular crown 3 externally coaxial to the hub 2 and supported in a rotationally free manner on the hub 2 by a pair of end bearings 4 and 5, and a filtering unit 6 interposed between the hub 2 and the crown 3 and housed in the space comprised radially between them and axially between the bearings 4 and 5.

The crown 3 is provided with an intermediate annular portion 7, which externally has a multi-groove profile 8 suitable for cooperating with a poly-V belt 9 (a section of which is schematically shown in FIG. 1).

The hub 1 is suitable for being rigidly fastened to a shaft, not shown, of an auxiliary member of an internal combustion engine, for example, a reversible electric machine with the functions of alternator and starter motor in a start-stop system.

The filtering unit 6 basically comprises an elastic assembly 10 and a damping assembly 11 arranged axially adjacent to each other.

The elastic assembly 10 basically comprises a coil spring 12 of rectangular-section wire and a pair of spring carriers 13 and 14 cooperating with respective opposite ends 15 and 16 of the spring.

Figures 4, 5, 6:
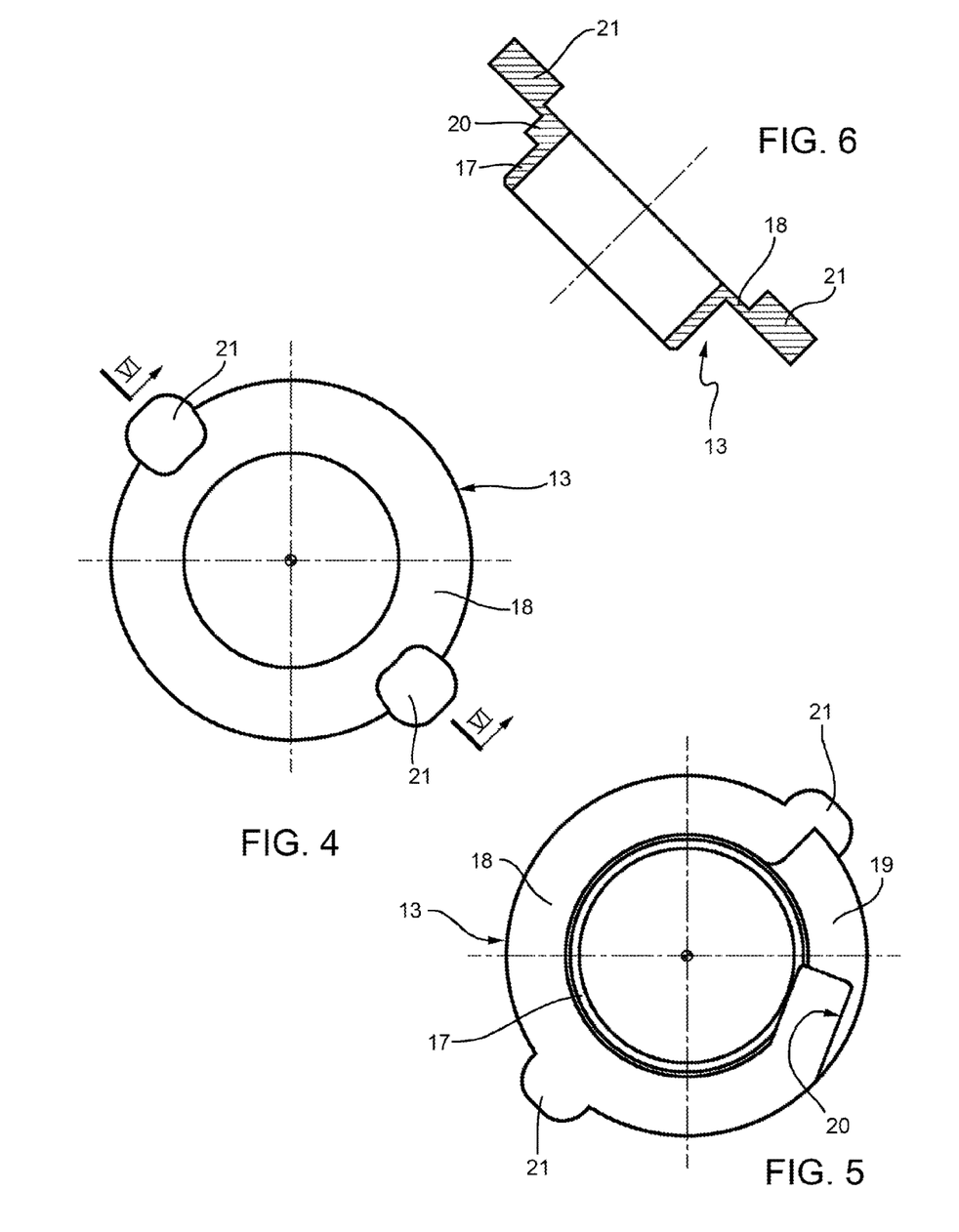
FIGS. 4 and 5 are respectively a front view and a rear view of a first component of the pulley in FIG. 1.
FIG. 6 is a cross-section along line VI-VI in FIG. 4.
Figure 7:
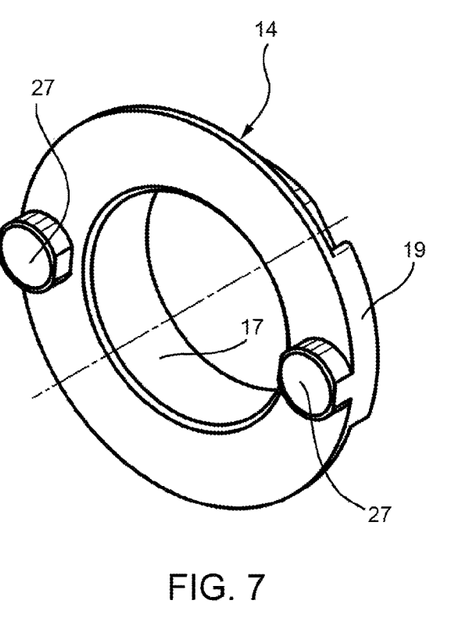
FIGS. 7 and 8 are perspective views, from opposite sides, of a second component of the pulley in FIG. 1.
Figure 8:
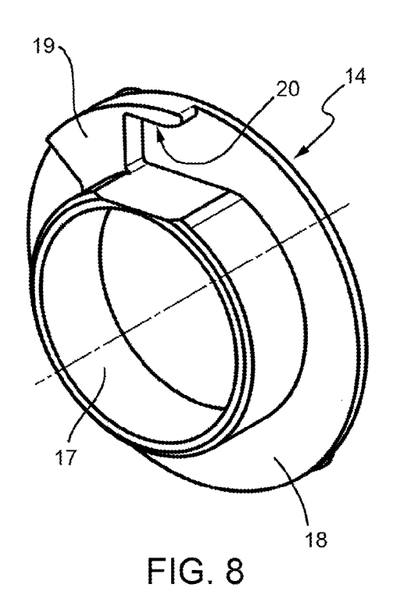
Figure 9:
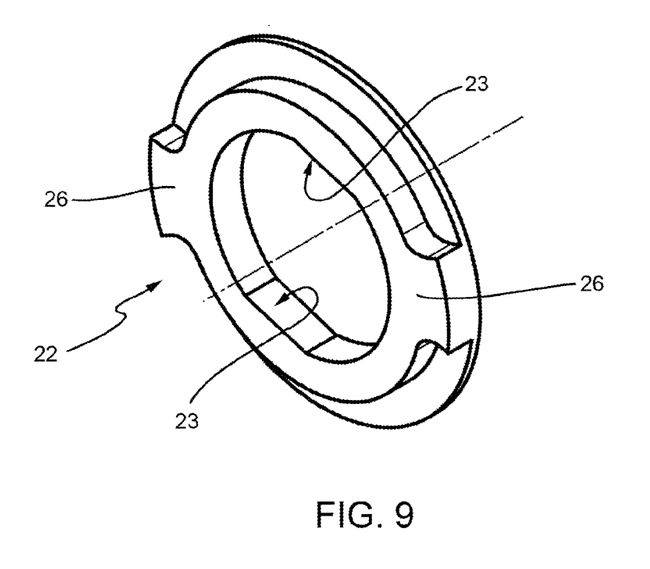
FIG. 9 is a perspective view of a third component of the pulley in FIG. 1.

The carriers 13 and 14, shown in greater detail in FIGS. 4-6 and in FIGS. 7 and 8, respectively, are preferably made of a plastic material and each have an inner tubular portion 17 fitted in a freely rotational manner on the hub 2 and radially interposed between the latter and the spring 12 to centre the spring and avoid contact between the spring and the hub, and a flange 18 extending radially outwards from an axial end of the tubular portion 15 and axially cooperating with the respective end 15 or 16 of the spring 12.

For this purpose, the flange 18 of each of the carriers 13 and has an axial projection 19 extending along a circumferential portion of the flange and integrally connected to the inner tubular portion 17.

A rectilinear seat 20, made in the aforementioned projection and substantially tangential with respect to the tubular portion 17, is engaged by end 15 or, respectively, end 16 of the spring 12 (FIGS. 5 and 8).

The ends 15 and 16 of the spring 12 are folded slightly inwards, so as to define with the respective seats 20 an anti-rotation coupling and are frontally flat so as to axially rest against the respective flange 18. The carriers 13 and 14 are thus integral with the ends of the spring 12.

Carrier 13 (FIGS. 4-6) has a pair of projections 21 extending axially from a peripheral portion of the flange 18, on the opposite side from the tubular portion 17 (and the spring 12), towards a drive ring 22 fitted on the hub 2, arranged axially adjacent to carrier 13 and forming part of the damping assembly 11. For example, the drive ring 22 can be equipped with two inner flats 23 that cooperate with respective milled areas 24 (FIG. 2) of the hub 2.

Figure 11:
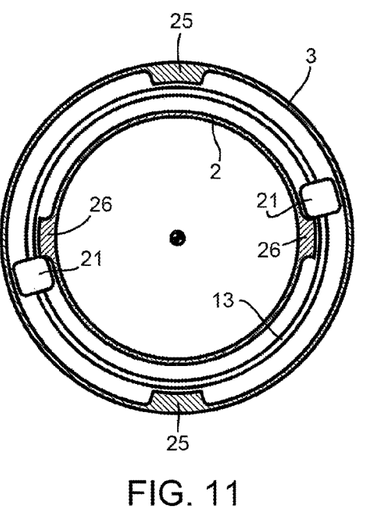
Figure 13:
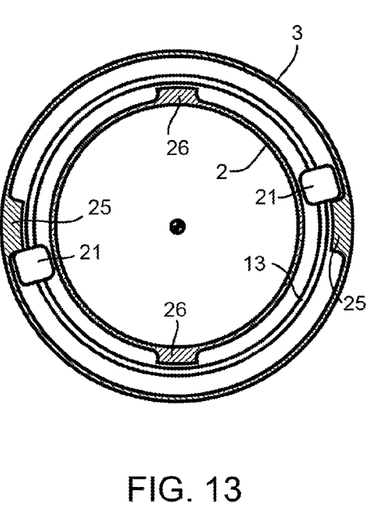

The projections 21 of carrier 13 are designed to interact with respective internal projections 25 (two at 180°) of the crown 3, and with respective projections 26 (two at 180°) of the drive ring 22, as schematically shown in FIGS. 11 and 13.

In this way, carrier 13 is rotationally coupled to the crown 3 and the hub 2 with a free angle of rotation of a little less than 180° with respect to both of them.

It should be noted that the projections 25 of the crown 3 are external with respect to the projections 26 of the drive ring 22, so that they cannot interact directly with them.

In exactly the same manner, carrier 14 (FIGS. 7 and 8) has a pair of projections 27 extending axially from the flange 18, on the opposite side from the tubular portion 17 (and the spring 12).

Figure 10:
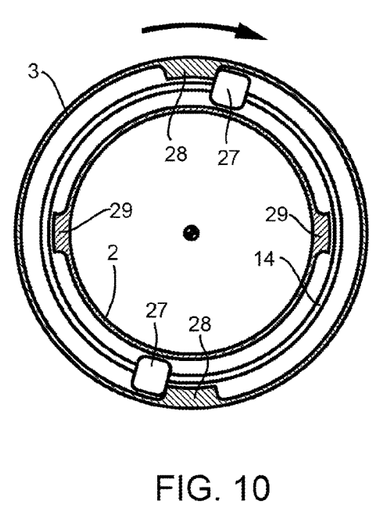
FIGS. 10 and 11, and 12 and 13 are diagrams showing different operating phases of the pulley of the invention.
Figure 12:
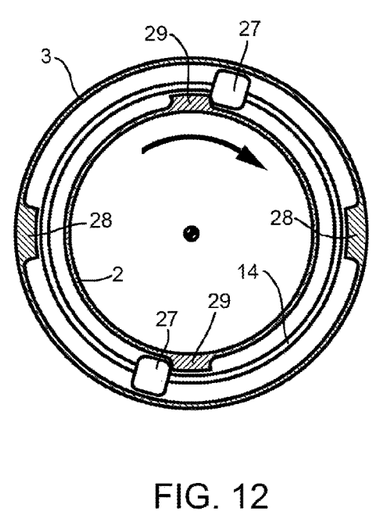

The projections 27 of carrier 14 are designed to interact with respective internal projections 28 (two at 180°) of the crown 3, and with respective external projections 29 of the hub 2. The projections 28 of the crown 3 are external with respect to the projections 29 of the hub 2, so that they cannot interact directly with them (FIGS. 10 and 12).

In addition to the drive ring 22 prismatically coupled to the hub 2, the damping assembly 11 comprises a friction disc 30 prismatically coupled to the crown 3, which is pushed against the drive ring 22, so as to slide with it, by a pair of annular wave springs 31 interposed between the friction disc 30 and a reaction ring 32, this also prismatically coupled to the crown 2 and resting axially against an outer ring of the bearing 4 with the interposition of a washer 33.

Operation of the pulley 1 is as follows.

Under normal conditions, i.e., when the pulley 3 drawn by the belt 9 drives the hub 2 and therefore tends to overtake it, the internal projections 28 of the crown 3 move into contact with the projections 27 of carrier 14 (FIG. 10); the latter drags the spring 12 and carrier 13, which is integral with it, in rotation until the projections 21 of carrier 13 abut against the projects 26 of the drive ring 22 integral with the hub 2 (FIG. 11). The spring 12, the direction of winding of which is such as to always make the wire work in compression, is thus elastically loaded by torsion and transmits the load from the crown 3 to the hub 2, at the same time performing the function of filtering torsional vibrations in combination with the damping assembly 11.

In the event of torque reversal, for example during starting or in the case of a sudden drop in engine speed, when the electric machine, due to inertia, tends to overtake the internal combustion engine, the projections 29 of the hub 2 cooperate with the projections 27 of carrier 14; the latter drags the spring 12 and carrier 13 in rotation, the projections 21 of carrier 13 acting on the projections 25 of the crown 3, driving it in rotation.

It should be noted that in both directions of torque transmission (from crown 3 to hub 2 or vice versa), the spring 12 is always stressed in the same direction (namely in the direction of compression of the wire, which corresponds to a radial expansion of the spring).

At each torque reversal transient, there is a free angle of rotation between the crown 3 and the hub 2. The spring 12 is only elastically loaded when all angular play between crown 3, carriers 13 and 14, and hub 2 has been recovered.

Figure 14:
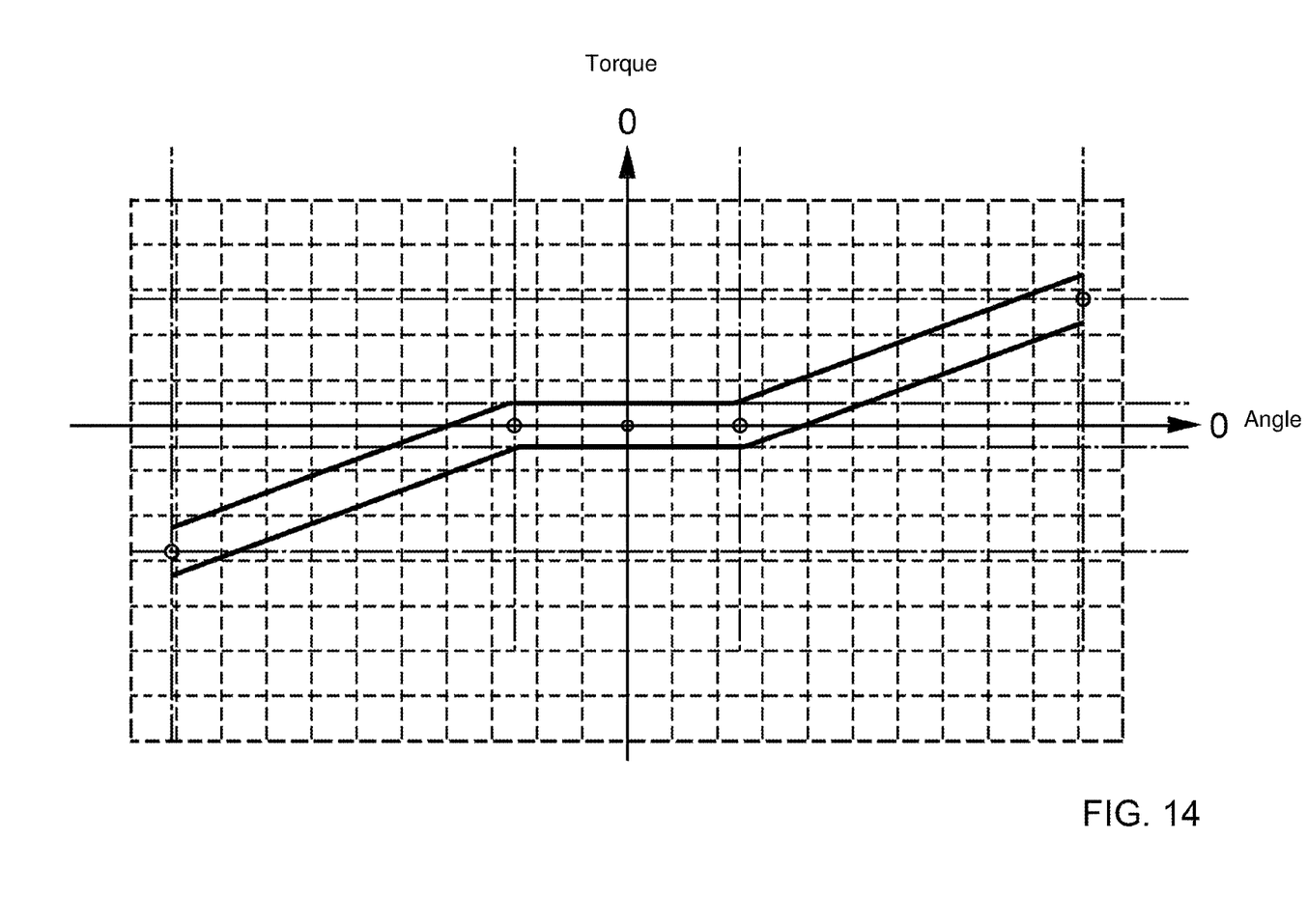
FIG. 14 shows a transmitted torque/relative rotation characteristic of the pulley in FIG. 1.

The transmitted torque/relative rotation characteristic shown in FIG. 14 is consequently obtained: there is free relative rotation (without the friction torque generated by the damping assembly 11) within the angle defined by the sum of crown-carrier-hub angular play in the two directions; for larger relative rotation angles, the characteristic is linear. The damping determines the hysteresis of the curve.

From examination of the characteristics of the described filtering pulley 1, the advantages it can provide are evident.

First of all, as disclosed above, the pulley enables providing torque transmission with limited relative rotation between crown 3 and hub 2 in both directions, and can therefore be validly employed in a start-stop type of transmission.

Due to the use of two carriers integral with the opposite ends of the spring 12 and both coupled with angular play to both the crown 3 and the hub 2, high free angles of rotation can be obtained. The magnitude of the free angle can be set as desired by altering the angular phasing between the seats 20 for the spring 12 and the projections 21 or 27 of each carrier.

The prismatic coupling between the ends 15 and 16 of the spring 12 and the carriers 13 and 14 avoids the so-called "ramp-up" phenomena, i.e. the tendency of the spring to "unscrew itself" with respect to the seat and rotate relative to the carriers when there is torque reversal and the consequent jamming of the filtering pulley.

The spring 12 is always stressed the same way (compression of the wire) in both modes of operation. Stress and fatigue are thus reduced.

Finally, it is clear that modifications and variants can be made to the pulley 1 described and illustrated herein without departing from the scope defined in the claims.

In particular, the coupling with angular play between the carriers 13 and 14, the hub 2 and the crown 3 could be implemented differently. For example, the number of projections of the carriers 13 and 14, of the hub 2 and of the crown 3 could be different (just one or more than two); the projections of the carriers could be radial (for example, an outer one and an inner one) instead of axial.

The invention claimed is:

1. A filtering pulley for an accessory drive of an internal combustion engine, comprising:
    a hub,
    an annular crown provided with a profile configured to cooperate with a drive belt, externally coaxial to the hub and supported in a rotationally free manner on the hub, and
    a filtering unit interposed between the hub and the crown and comprising;
        a coil spring able to transmit torque between the crown and the hub,
        a first carrier constrained to a first end of the spring; and
        a second carrier constrained to a second end of the spring, wherein each of said first and second carriers are fitted in a freely rotational manner to both the hub and the crown with an angular play with respect to the hub and the crown.

2. A pulley according to claim 1, characterized in that the ends of the spring are constrained to the respective carriers to prevent slipping off by way of relative rotation.

3. A pulley according to claim 1, characterized in that said carriers are supported on said hub and are housed within said crown.

4. A pulley according to claim 1, characterized in that rotational coupling between each of the carriers, the hub and the crown is obtained by at least one projection carried by each carrier and respective stops carried by the hub and by the crown.

5. A pulley according to claim 1, characterized in that rotational coupling between each of the carriers, the hub and the crown is obtained by at least respective projections carried by the hub and by the crown and at least a stop carried by each carrier.

6. A pulley according to claim 1, characterized in that rotational coupling between each of the carriers, the hub and the crown is obtained by at least one projection carried by the carrier and at least corresponding projections carried by the crown and by the hub.

7. A pulley according to claim 6, characterized in that said projections carried by the hub and by the crown are configured so as not to directly interact with each other during the relative rotation between the hub and the crown.

8. A pulley according to claim 6, characterized in that the projections of said carriers extend in the axial direction, and that the projections carried by the hub and by the crown are radial, the projections of said carriers being configured so as to cooperate with both a corresponding projection of the crown and a corresponding projection carried by the hub.

9. A pulley according to claim 8, characterized in that each carrier comprises a pair of projections arranged at 180°, corresponding pairs of projections being carried by the hub and by the crown.

10. A pulley according to claim 9, characterized in that said projections carried by the crown are integral with the crown, and that at least one of the projections carried by the hub is integral with a drive ring fitted on the hub.

11. A pulley according to claim 9, characterized in that said projections carried by the crown are integral with the crown, and that at least one of the projections carried by the hub is integral with a drive ring fitted on the hub, wherein said filtering unit comprises a damping assembly that comprises an element integral with the hub, an element integral with the crown and elastic means acting on one of said elements to keep said elements in axial contact with one another so as to slide following a relative rotation between said hub and said crown, and said element integral with the hub is said drive ring.

12. A pulley according to claim 1, characterized in that said filtering unit comprises a damping assembly interposed between said crown and said hub.

13. A pulley according to claim 12, characterized in that said damping assembly comprises an element integral with the hub, an element integral with the crown and elastic means acting on one of said elements to keep said elements in axial contact with one another so as to slide following a relative rotation between said hub and said crown.

14. A pulley according to claim 1, characterized in that said coil spring has a winding direction such that the wire is always stressed in compression, both when the crown tends to overtake the hub and when the hub tends to overtake the crown.

* * * * *

UNITED STATES PATENT AND TRADEMARK OFFICE
CERTIFICATE OF CORRECTION

PATENT NO. : 9,850,997 B2  
APPLICATION NO. : 14/910403  
DATED : December 26, 2017  
INVENTOR(S) : Gianluca Cariccia et al.

Page 1 of 1

It is certified that error appears in the above-identified patent and that said Letters Patent is hereby corrected as shown below:

On the Title Page

Item (87), the PCT Pub. Date for PCT Pub. No. WO2015/019301 should read --Feb. 12, 2015--

Signed and Sealed this  
Twenty-sixth Day of June, 2018

Andrei Iancu  
*Director of the United States Patent and Trademark Office*